United States Patent
Sadler et al.

[11] 3,707,981
[45] Jan. 2, 1973

[54] COMPENSATING UNLOADER VALVE

[75] Inventors: Harry J. Sadler, St. Paul; Ramon Pareja; John Leschisin, both of Minneapolis, all of Minn.

[73] Assignee: Lear Siegler, Inc., Maple Heights, Ohio

[22] Filed: Sept. 8, 1971

[21] Appl. No.: 178,625

[52] U.S. Cl. .................137/115, 137/108, 137/118, 137/119, 137/493.1
[51] Int. Cl. ..............................................F16k 17/04
[58] Field of Search...137/108, 102, 115, 119, 493.1, 137/625.68, 118; 239/124, 125, 126, 127

[56] References Cited

UNITED STATES PATENTS

| | | | |
|---|---|---|---|
| 2,858,842 | 11/1958 | Reis | 137/108 |
| 3,358,705 | 12/1967 | Krechel | 137/119 |
| 3,455,322 | 7/1969 | Chichester | 137/108 |
| 3,524,465 | 8/1970 | Sadler | 137/115 |

*Primary Examiner*—M. Cary Nelson
*Assistant Examiner*—William H. Wright
*Attorney*—Orrin M. Haugen

[57] ABSTRACT

An unloader valve apparatus arranged for compensating for variations in pressure and capacity, and comprising, in combination, a valve housing having an inlet, a first outlet defining a normal discharge, and a second outlet arranged between the inlet and the normal discharge and defining an unloading discharge outlet. The housing is provided with a bore for receiving a valve plunger or an intermediate sealing liner or sleeve which itself receives the plunger, with the valve plunger having a bore extending therethrough to permit fluid communication between the inlet and the normal discharge. Circumferential sealing means including an outer seal along the periphery of the plunger and mating sealing means along the inner periphery of the housing are provided, with the plunger being adapted for reciprocatory sliding movement within the housing. The plunger is provided, with a working area differential for plunger motion, including a certain first annular area disposed in opposed relationship to the inlet port and a certain second and larger annular area disposed in opposed relationship to the outlet port, with the plunger being normally resiliently biased toward the outlet port to establish communication between the inlet and the normal outlet discharge, and with the circumferential sealing means normally blocking communication between the inlet and the unloading discharge outlet. An annular chamber is arranged between the outer diameter of the plunger and the inner diameter of the housing or housing sleeve, with the plunger having means establishing communication between the inlet and the annular chamber. Check valve means are interposed in the bore of the valve plunger and are arranged to move or function axially within the bore to block fluid passage through the bore in response to an increase in pressure in the normal discharge outlet, and thereby permit the increased pressure which is exposed to the larger area of the area differential to establish a force to move the valve plunger against the bias to establish fluid communication between the inlet and the unloading discharge outlet. Upon reaching this condition, the force working against the inlet side or area of the plunger falls substantially, the check valve closes, and the entire area of the outlet side of the plunger is exposed to the outlet pressure. This combination of conditions acts to snap the plunger into the unloading position.

The circumferential sealing means includes an axially elongated peripheral seal surface extending between the outer surface of the plunger and the inner surface of the valve housing, with the sealing means being disposed between the annular reservoir chamber and the unloading discharge port while the plunger is in its normal disposition. The circumferential seal means is arranged to provide a continuation of sealing along the axially elongated peripheral seal surface while the plunger moves or floats axially for a substantial distance to an intermediate or floating sealing position away from the normal position and toward the unloading position against the resilient bias and in response to normal variations in fluid pressure existing in the discharge outlet, due to normal manufacturing tolerances in the pump, and in the resilient valve spring force.

11 Claims, 11 Drawing Figures

United States Patent [19]
Sadler et al.
[11] 3,707,981
[45] Jan. 2, 1973
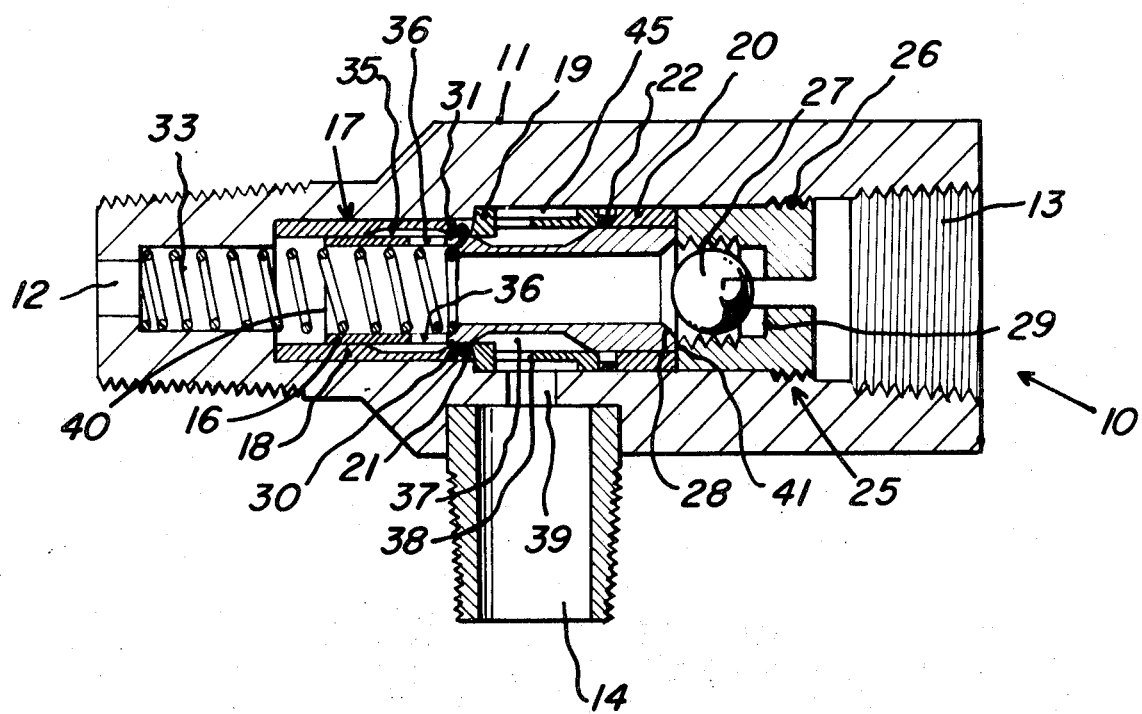

INVENTORS.
Harry J. Sadler
Ramon Pareja
John Leschisin
BY
Orrin M. Haugen
ATTORNEY

PATENTED JAN 2 1973 3,707,981

INVENTORS.
Harry J. Sadler
Ramon Pareja
John Leschisin

BY

*Orrin M. Haugen*
ATTORNEY

INVENTORS.
Harry J. Sadler
Ramon Pareja
BY John Leschisin

Orrin M. Haugen
ATTORNEY

INVENTORS.
Harry J. Sadler
Ramon Pareja
John Leschisin

BY

ATTORNEY

COMPENSATING UNLOADER VALVE

BACKGROUND OF THE INVENTION

The present invention relates generally to an unloader valve structure, and more specifically to a compensating unloader valve having an inlet, a normal discharge outlet, and an unloading discharge outlet, with the unloader function being accomplished by articulation of a valve plunger which is adapted to reciprocate between first and second stable positions, and to be disposed at a compensating or floating intermediate position during movement of fluid therethrough. Motion of the plunger is in response to hydraulic forces acting upon differential areas; the first disposition of the plunger is arranged to provide communication between the inlet and the normal discharge outlet, with the unloading discharge outlet being isolated from the inlet, while the second disposition establishes fluid communication between the inlet and the unloading discharge, while isolating the inlet from the normal outlet. A compensating function is provided in the valve assembly by means of the unloader valve being able to seek an intermediate position between the first and second stable positions, with the intermediate position providing flow functions equivalent to the flow functions in the first stable position.

In the design of systems for the discharge of fluid under pressure, a number of parameters are ordinarily considered. Among these are the pressure and capacity of the pump, the spring force available in springs selected for the unloader valve, as well as the design of the discharge nozzle. In the manufacture of pumps for delivering fluid at high pressure, conventional manufacturing techniques will ordinarily provide finished products with a certain modest range of tolerances for the desired pressure and capacity characteristics. In the manufacture of valves, springs will be selected having normal force variations and in the manufacture of nozzles or other discharge orifices, ordinary manufacturing techniques will utilize tolerance levels which will product individual nozzles or discharge orifices with similarly varying characteristics. When a specific pump is coupled to a specific discharge orifice, therefore, ordinary selection of components may provide the coupling of a pump with excessive pressure and capacity capability with a nozzle having a restricted orifice. Unloader valve selection poses similar problems. In certain use environments, nozzles or discharge orifices are frequently damaged so as to result in a constricted outlet. Continued use of a pump in such an environment may result in modestly elevated or excessive operating pressures being developed in the system. While not damaging the pump, these pressures may render certain unloader valves unstable, and resulting in periodic or cyclic unloading or "hunting" of the valve during operation of the system. Spurious unloading cycles are generally deemed undesirable, and the user of the system may find the pulsating output cumbersome, and the unloading feature wasteful of the fluids being pumped.

In those systems where fluid under pressure is intermittently utilized, the operator employing a shutoff valve in the line, unloader valves are conventionally employed to permit the pump to deliver fluid continuously, but through an unloading discharge outlet, thus substantially reducing the build-up of pressure in the system. Reciprocating piston pumps or other positive displacement pumps will ordinarily require an unloading discharge of this type if excessive wear in the pump is to be avoided. Normally, when unloader valves are selected for use in such a system, initial adjustments may be required in order to match the unloader valve to the components in the system in order to avoid having the unloader valve operating in a spurious fashion. Since continued operation of a system will frequently cause errosion corrosion, or abrasion of certain components, the characteristics and parameters of the system will continuously vary, thus requiring frequent or continuous adjustment of the unloader valve. The present invention utilizes a structure which is self-compensating in its unloading characteristics, and thus enhances the effectiveness of the unloader valve and permits its application to a variety of fluid handling systems, including systems with components having wide manufacturing tolerances.

SUMMARY OF THE INVENTION

It is therefore an object of the present invention to provide an improved compact unloader valve which is self-compensating in its operation, and is designed to accommodate those various design tolerances which normally occur in the manufacture of the valve per se and also in positive displacement pumps, and component parts frequently used in combination with such pumps, such as nozzles, orifices, and the like.

It is a further object of the present invention to provide an improved unloader valve which is capable of operation through a pre-determined range of operating parameters including operating pressures, capacities, and the like, with the unloader valve having a capability of stable operation within a range of manufacturing tolerances and operating parameters.

It is yet a further object of the present invention to provide an improved unloader valve which eliminates the tendency to function as a pulsating relief valve.

Other and further objects of the present invention will become apparent to those skilled in the art upon a study of the following specification, appended claims, and accompanying drawings.

BRIEF DESCRIPTION OF THE DRAWINGS

FIG. 5 being similar in that respect to FIG. 2;

DESCRIPTION OF THE PREFERRED EMBODIMENT

Figure 1:
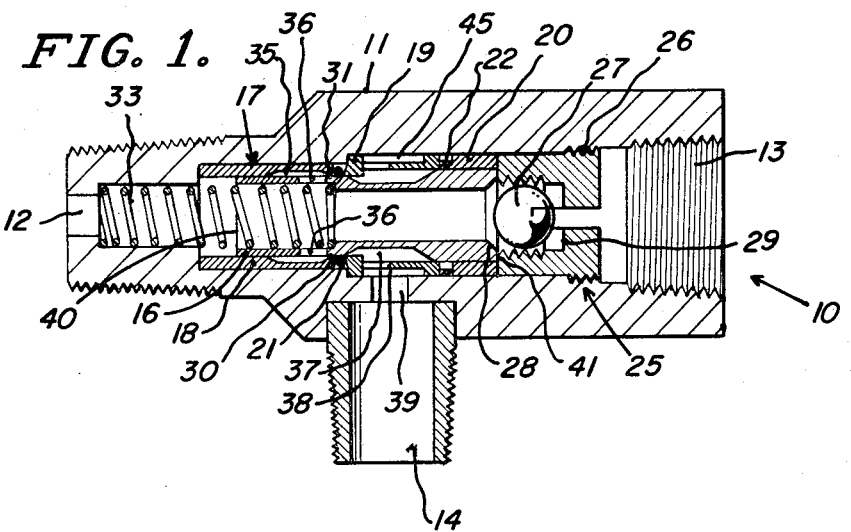
FIG. 1 is a vertical sectional view taken through the diameter of the structure, and showing the valve and its plunger in an operating mode wherein the pump is providing fluid at below normal pressure, with the unloader valve being disposed so as to permit fluid flow between the inlet and the normal discharge outlet.
Figure 2:
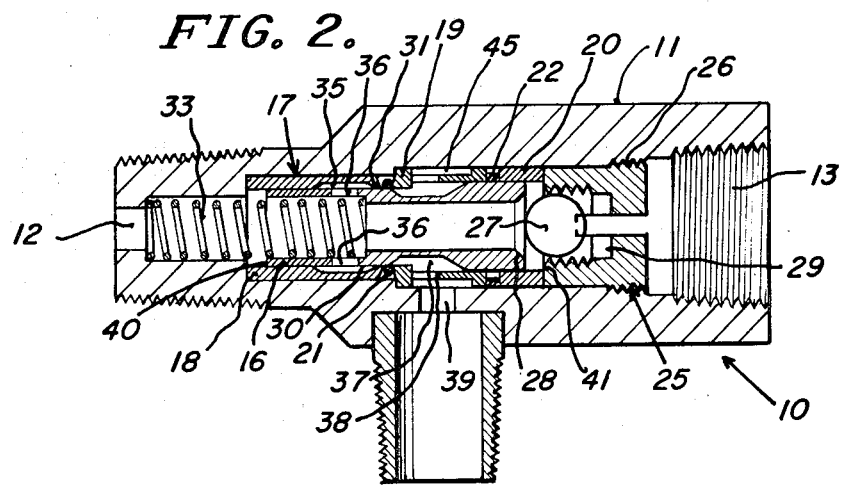
FIG. 2 is a view similar to FIG. 1 with the unloader valve in a disposition assumed when the pump is delivering fluid to the system at a slightly elevated pressure level, the valve being disposed so as to permit fluid flow between the inlet and the normal discharge outlet.
Figure 3:
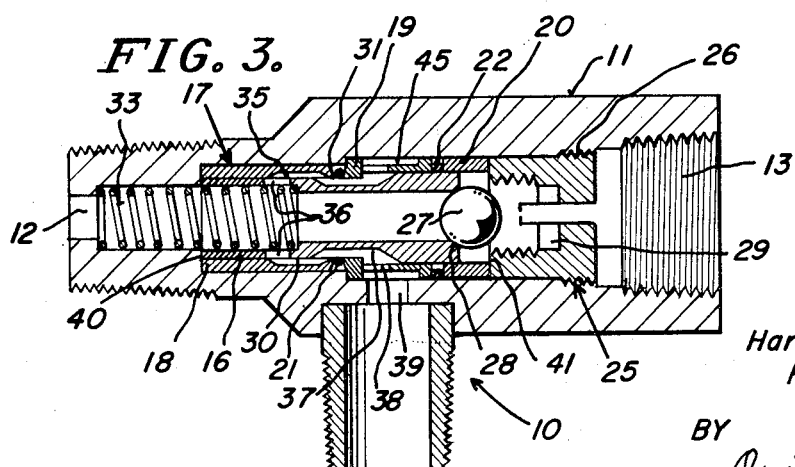
FIG. 3 is a view similar to FIG. 1 with the unloader valve in a disposition isolating the inlet from the normal discharge outlet, and providing for communication between the inlet and the unloading discharge.

In accordance with the preferred modification of the present invention, and with particular reference to FIGS. 1, 2 and 3 of the drawings, the unloader valve apparatus generally designated 10 includes a valve housing 11 having an inlet port 12, a first outlet port 13 defining a normal discharge outlet, and a second outlet port 14 defining an unloading discharge port. As is apparent in the structure shown in FIG. 1, the unloading discharge port 14 is disposed between the inlet port 12 and the normal discharge port 13. Also, as is apparent in the structure illustrated in FIG. 1, the housing 11 is provided with an internal bore, along with a plurality of counter-bores, to contain and house the working components of the unloader valve system.

Figure 1A:
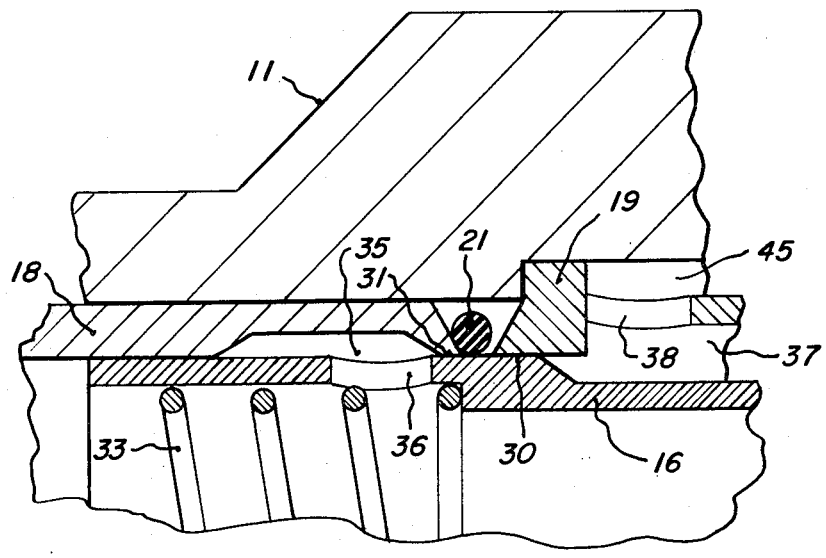
FIG. 1a is a detail vertical sectional view on an enlarged scale showing the detail of the configuration of the seal ring while in the disposition illustrated in FIG. 1 and with the annular gap area for retaining the O-ring being shown enlarged.
Figure 2A:
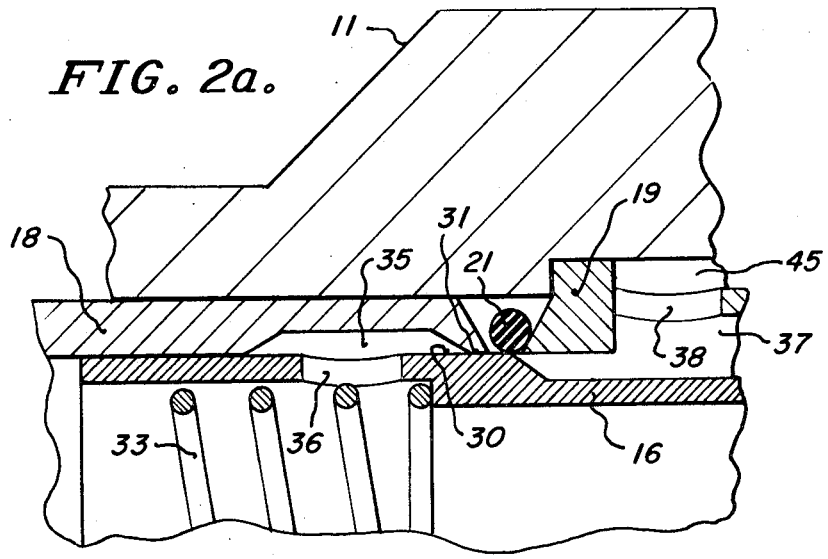
FIG. 2a is a detail vertical sectional view on an enlarged scale showing the detail of the configuration of the seal ring while in the working disposition illustrated in FIG. 2 and with the annular gap area for retaining the Oring being shown enlarged.

The unloader valve comprises a plunger 16, which is received within the confines of sealing liner or sleeve generally designated 17, sealing sleeve 17 including plural segments, such as the segments 18, 19, and 20, along with a pair of sealing rings such as at 21 and 22. Sealing ring 21 is retained in a dove-tail chamber or zone formed by chamfers on the ends of segments 18 and 19 as shown in FIGS. 1a and 2a. In order to prevent deformation of the seal 21, this component is normally fabricated from relatively rigid and durable elastomer materials. Plunger 16 is arranged to move reciprocably within the confines of sealing sleeve 17, as is described in greater detail hereinafter. Check valve means 25 are also provided in housing 11, with the check valve means including a ball retainer 26, along with ball check 27. Ball check 27 is adapted to seat against the annular seat formed in plunger 16, as at 28. When removed from seat 28, ball 27 is held by cage structure 29 in order to permit fluid flow around the outer periphery or circumference of the ball check 27, as is illustrated in FIG. 1. Cage 29 comprises abutment surfaces disposed about a slotted or through-bore, with the cage structure including a plurality, preferably two or three, web or shoulder abutments which support ball check 27 in raised disposition, thereby permitting fluid flow therearound, and into the through-bore. Such web structures are, of course, preferably equally arcuately spaced. Poppet valves could be used if desired.

With attention being continued to the structure shown in FIG. 1, circumferential sealing means are provided in the arrangement, including an outer seal disposed on the periphery of plunger 16, such as at 30, with a mating sealing means being disposed along the inner periphery of the housing as at 31. Sealing ring 21 is incorporated as a component in the sealing means 31, it being apparent that the sealing means 31 is adapted to engage and mate with sealing component 30. Spring member 33 is utilized to provide a resilient bias on plunger 16, so as to normally force plunger 16 toward the normal discharge outlet port 13.

Sealing sleeve 17 is provided with an annular chamber as at 35, with the annular chamber 35 being disposed between the outer diameter of the plunger 16 and the inner diameter of sealing sleeve 17. Annular chamber 35 provides a means for establishing communication between the transverse openings or ports 36—36 formed in plunger 16 and the unloading discharge port, with annular chamber 37 being provided in plunger 16 to assist in this purpose. Also, as is apparent in the drawing, transverse ports 38—38 are provided in sealing sleeve 17 so as to establish a flow path to port 39 which is in open communication with unloading discharge port 14.

With attention being directed to the structural features of plunger 16, it will be observed that the annular face as at 40 has a certain first annular area, with face 40 being disposed in opposed relationship to the inlet port 12. Furthermore, the annular face adjacent seat 28, as at 41, has a second annular area, with face 41 being disposed in opposed relationship to outlet port 13.

With continued attention being directed to the structure illustrated in FIG. 1, it will be observed that the circumferential sealing means is in the form of an axially elongated peripheral seal surface which extends between the annular reservoir chamber 35 and the annular chamber 37, with the structure isolating chambers 35 and 37 when the plunger is in its normal disposition. The circumferential sealing means is arranged to provide for a continuation of sealing along the elongated seal surface while the plunger is moved axially for a substantial distance away from the normal disposition, and toward the unloading disposition. At such an intermediate sealing disposition, normal flow continues. It will be appreciated that the axial movement away from the normal disposition and toward the unloading disposition is in a direction against the resilient bias of spring 33, and in response to an elevated fluid pressure present in the discharge outlet 13. Such an intermediate disposition is provided in the structure and compensates for variances in pressures and capacities of positive displacement pumps, variances in spring forces, as well as variances in areas formed in discharge orifices, nozzles, and the like. This intermediate sealing disposition enables the valve structure to be self-compensating, and accordingly does not require the unloader to be specifically adjusted for use in combination with a certain pump and orifice combination, with the pump and orifice combination being selected from parts manufactured to the same specification, but with different tolerances.

In a typical system, utilizing a pump having a normal running pressure of 500 psi, and a capacity of 3 gallons per minute, and with a nozzle orifice selected for use at such pressures and capacities, the following operating parameters will normally be employed for the unloader valve:

| | |
|---|---|
| Area of annular face 40 | 0.158 sq.in. |
| Area of annular face 41 | 0.190 sq.in. |
| Force of spring 33 in normal working disposition | 16 pounds |

The structure illustrated in FIGS. 1, 2 and 3 suggest that the sealing area 31 is in the form of a collar zone formed along the inner periphery of the sealing sleeve 17. Obviously, other arrangements may be made for providing the elongated circumferential sealing area. It will be further observed that the axial area separating chamber 35 from sealing area 31 is tapered, and a matching taper is available in plunger 16 in the area adjacent annular zone 37. Such matching of tapers is believed to enhance the positive action of the structure in its moving between normal disposition and unloading disposition. Also, in order to enhance the compensating characteristics of the structure, the collar portion of seal 31 extends essentially the entire length of travel of the plunger, such as is apparent in the structural arrangements shown in FIGS. 1 and 3.

The unloader valves of the above design may be utilized to operate under a wide range of pre-determined operating conditions. A valve designed to operate in a system at a working pressure of 500 psi may operate with an inlet pressure range of up to 600 psi. Capacities ranging from between zero and the maximum working capacity may be accommodated. Such a pre-setting of parameters will permit the unloader valve to function normally with pumps having a pressure and capacity capability within this range, particularly when utilized with suitably matching orifices. The resilient bias available in springs such as the spring 33 will be adapted to permit the structures to operate in a compensating mode within these pre-determined limits. However, when the upper pressure limit is exceeded, such as when the orifice or nozzle is closed, the unloader will immediately snap into the disposition illustrated in FIG. 3. Any unusual or anomalous characteristics in the force of spring 33 or in the system discharge components which would normally be reflected in higher operating pressures are accordingly self-compensating. The pump is thoroughly protected against excessive operating pressures which may develop if damage occurs to the nozzle or if plugging occurs.

For materials of construction, either metal or plastic parts may be employed. In order to assist in the assembly of the structure, the bore formed in the body 11 includes a pair of counter-bores, with the first counter-bore receiving the segment 18 of sealing sleeve 17, and with the second counter-bore providing a cavity to receive segment 19. As is apparent in FIGS. 1-3, the second counter-bore area provides an annular fluid flow chamber as at 45, chamber 45 extending between openings 38 and port 39.

Figure 4:
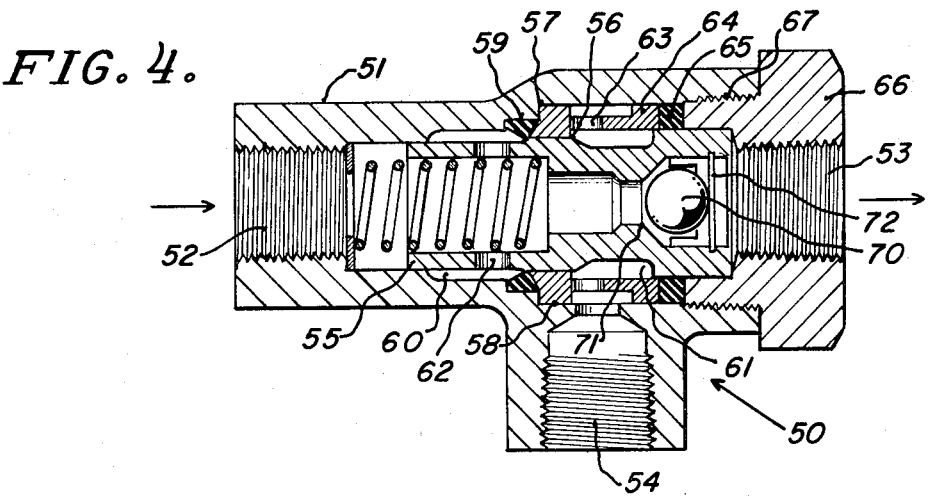
FIG. 4 is a view similar to FIG. 1 of a slightly modified form of unloader valve, and illustrating the structure in an operating disposition similar to that shown in FIG. 1.
Figure 5:
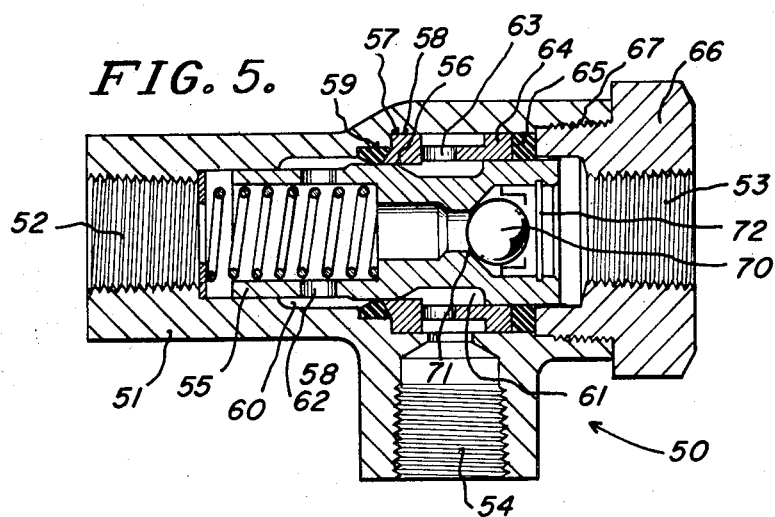
FIG. 5 is a similar view of the structure of FIG. 4 and illustrating the disposition of the unloader valve structure when subjected to a pump delivering fluid to the system at a slightly elevated pressure.
Figure 6:
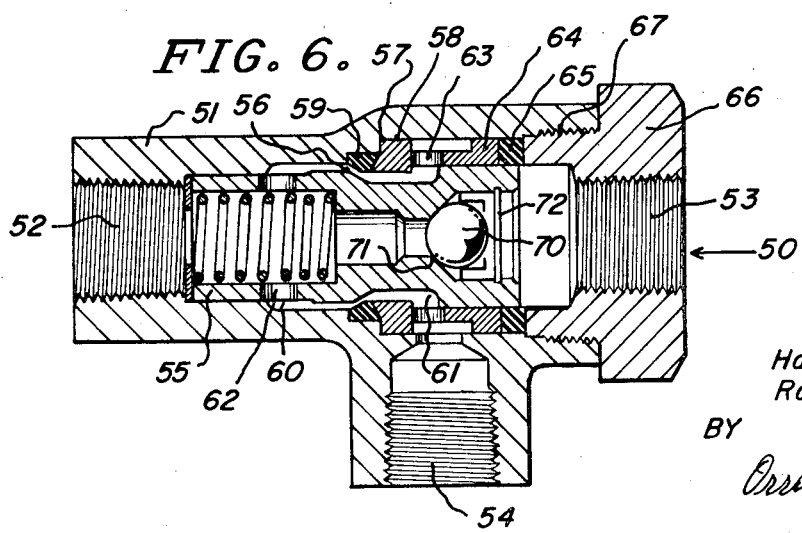
FIG. 6 is a further view of the structure of FIG. 4, and illustrating the disposition of the unloader valve isolating the inlet from the normal discharge outlet, and providing for communication between the inlet and the unloading discharge, with FIG. 6 being similar in that respect to FIG. 3.
Figure 7:
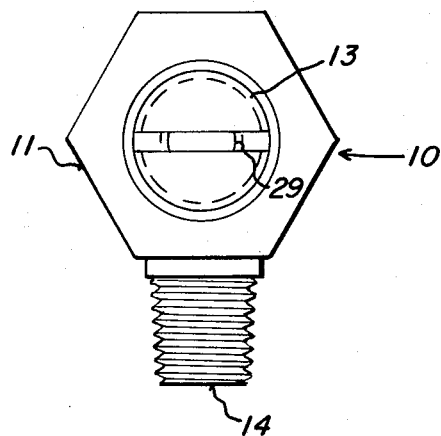
FIGS. 7, 8 and 9 are front, top, and rear elevational views respectively of that valve structure prepared in accordance with the modification illustrated in FIGS. 1-3 herein.
Figure 8:
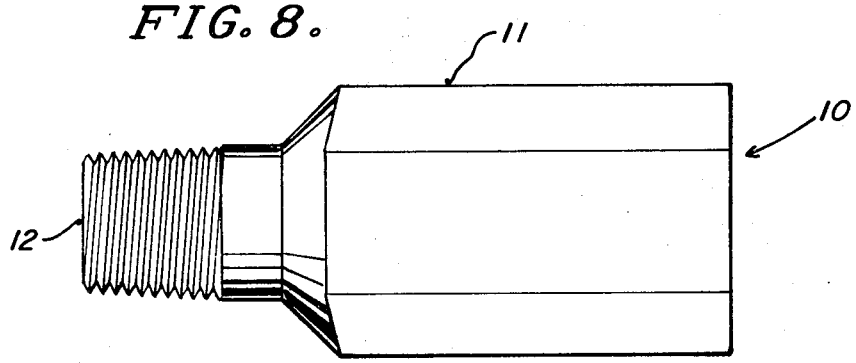
Figure 9:
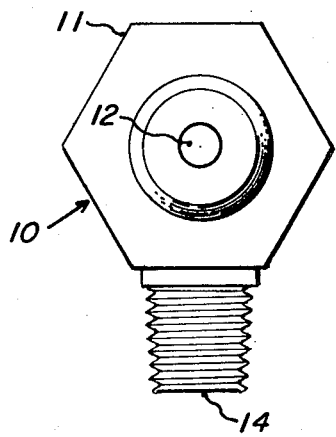

Attention is now directed to the modified structure illustrated in FIGS. 4, 5 and 6, wherein the unloader valve generally designated 50 includes a housing 51 having a bore formed therein establishing an inlet port 52, an outlet or discharge port 53, together with an unloading port 54. Plunger 55 is received within the bore, and is similar in most respects to plunger 16 illustrated in connection with the structure of FIGS. 1-3. Plunger 55 is sealed within the bore formed in the housing 51 by circumferential sealing means, including a seal formed on the outer surface of plunger 55 as at 56, along with a mating sealing means formed on the inner periphery of the housing as at 57. It will be observed that sealing means 57 includes a segment 58 in the form of an elongated collar seal, together with a resilient ring seal member 59. Annular cavity 60 is formed in body 51, and annular cavity 61 is formed in plunger 55, to provide for fluid flow between the inlet 52 and the unloading outlet 54, with transverse bores 62 in plunger 55 and 63 in seal member 64 being utilized to complete the fluid flow path between inlet 52 and unloading outlet 54. Back-up seal 65 is provided in order to permit compression to be established in the structure, with member 66 being utilized to provide a force against seal 65. As is indicated, member 66 is threadedly coupled to the interior of body 51, as shown at 67.

The ball check 70 is received within the confines of plunger 55 in a manner similar to that illustrated in the structure shown in FIGS. 1-3, with the exception being that ball check 70 seats directly against seat area 71 and is retained in a cage formed in plunger 55. Retainer plate 72 is utilized to hold ball check 70 securely in place.

The operational features of the structure shown in FIGS. 4, 5 and 6 are essentially identical to the operational features of the structure illustrated in FIGS. 1-3, and it is not deemed necessary to describe the operation of this modified embodiment.

The unloader valves of the present invention may, of course, be calibrated for use in combination with other systems which are designed for operation under known pressure and capacity requirements. The unloader valve will compensate in its operation so as to accommodate and adapt to normal use in the field.

It will be observed that the unloader valve of the present invention include three basic design parameters, these including the following:

A. Surface area of annular face 40;
B. Surface area of annular face 41;
C. Characteristics of spring 33.

By careful selection of these various design parameters, a single family of unloader valves having pressure capabilities from greater than zero up to, for example, 1000 psi or more, and capacity characteristics ranging from greater than zero up to 15 g.p.m. or more may be prepared. Such structures may be prepared from a single size or style of housing, along with a single style or design of plunger. Variations in length of the sealing area between the plunger and the housing may be utilized to control the tolerance level or range for the unloader valve. Obviously, it will be appreciated that the sizes of the structure may be controlled or modified so as to accommodate different ranges of pressures and capacities, such considerations being, of course, within the normal skill of the designer.

We claim:

1. Unloader valve apparatus comprising, in combination, a valve housing having an inlet, a first outlet defining a normal discharge, a second outlet between said inlet and said normal discharge defining an unloading discharge, unloader valve means operatively coupled between said inlet and each of said outlets, said unloader valve means comprising:
   a. a valve plunger having a bore extending therethrough to permit fluid communication between said inlet and said normal discharge, circumferential sealing means including an outer seal disposed along the periphery of said plunger and adapted for reciprocatory sliding movement within said housing, and mating sealing means along the inner periphery of said housing adapted to engage said outer sealing means;
   b. said plunger having a certain first annular area arranged in opposed relationship to said inlet port and a certain second annular area disposed in opposed relationship to said outlet port and being normally resiliently biased to establish communication between said inlet and said normal discharge, and with said circumferential sealing means normally blocking communication between said inlet and said unloading discharge;
   c. an annular chamber arranged between the outer periphery of said plunger and the inner periphery of said housing and having means establishing communication along said plunger between said inlet and said annular chamber;
   d. check valve means interposed within said valve housing and being arranged to move axially within said housing to block fluid passage through said bore in response to an increase in pressure in said normal discharge outlet and thereby permit said increased pressure to move said valve plunger against said bias to establish fluid communication between said inlet and said unloading outlet;
   e. said circumferential sealing means including an axially elongated peripheral seal, and being disposed between said annular reservoir chamber and said unloading discharge port while said plunger is in said normal position;
   f. said peripheral seal being arranged for a continuation of sealing along said axially elongated seal surface while said plunger is moved axially for a substantial distance to an intermediate sealing position away from said normal position and toward said unloading position against said resilient bias in response to pressure in said normal discharge outlet.

2. The unloader valve apparatus as defined in claim 1 being particularly characterized in that said circumferential sealing means includes a radially inwardly extending collar zone formed along the inner periphery of the plunger receiving bore of said housing and arranged in sealing engagement with the outer periphery of said plunger.

3. The unloader valve apparatus as defined in claim 2 being particularly characterized in that the axial end of said collar is tapered toward said annular chamber.

4. The unloader valve apparatus as defined in claim 1 being particularly characterized in that the check valve means interposed in said valve plunger is a ball-check.

5. The unloader valve apparatus as defined in claim 1 being particularly characterized in that communication between said inlet and unloading discharge is through an annular passage zone within said valve housing circumscribing the periphery of the valve plunger.

6. The unloader valve apparatus as defined in claim 5 being particularly characterized in that said valve plunger seats against an annular seat disposed adjacent said normal discharge.

7. The unloader valve apparatus as defined in claim 1 being particularly characterized in that a resilient spring member is disposed within said housing and is arranged to mate with an inner portion of said plunger to resiliently bias said plunger.

8. The unloader valve apparatus as defined in claim 1 being particularly characterized in that a second annular chamber is disposed within a counter-bore formed within said housing, said second annular chamber communicating with said unloading discharge outlet.

9. The unloader valve apparatus as defined in claim 2 being particularly characterized in that said collar zone seals against said plunger along essentially the entire length of travel of said plunger while operating below the maximum working pressure of the system.

10. The unloader valve apparatus as defined in claim 1 being particularly characterized in that said second annular area is substantially greater than said first annular area.

11. The unloader valve apparatus as defined in claim 1 being particularly characterized in that said ball check is received within a frame means threadedly mounted within said valve housing.

* * * * *